Feb. 7, 1933.　　　　R. G. BACHELLER　　　　1,896,657
CONVEYING MECHANISM FOR GLASSWARE AND THE LIKE
Original Filed Jan. 9, 1928
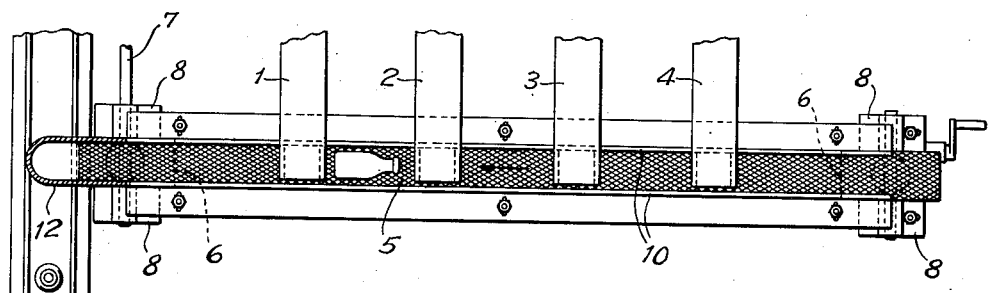
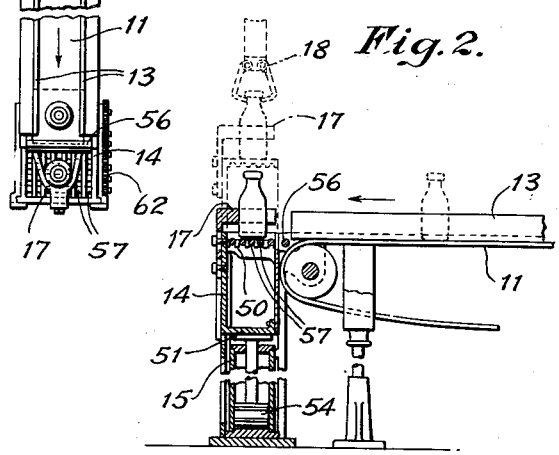
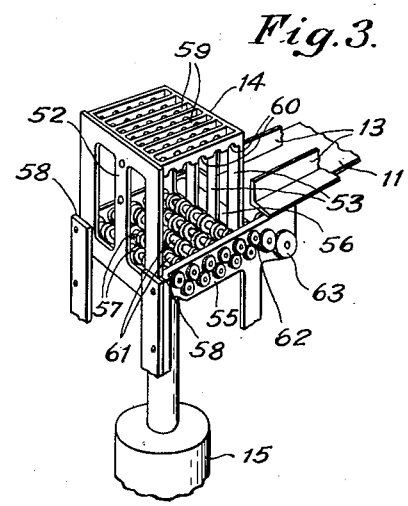
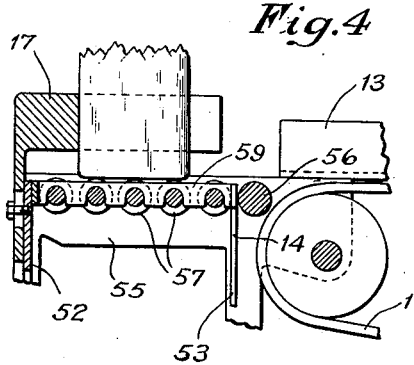
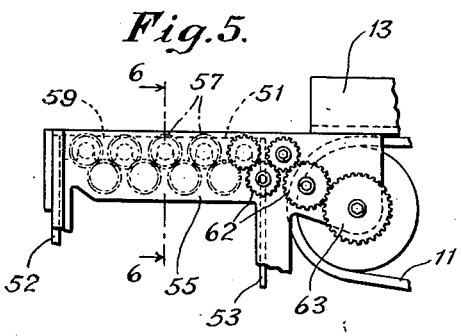
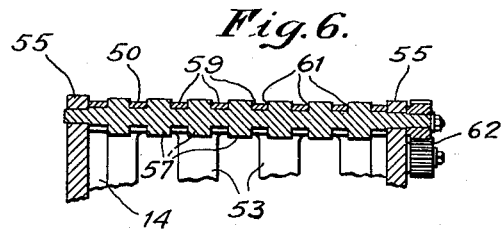
*Inventor*
*R. G. Bacheller*
*by Brown & Parham*
*Attorneys.*

Patented Feb. 7, 1933

1,896,657

UNITED STATES PATENT OFFICE

RAYMOND G. BACHELLER, OF HARTFORD, CONNECTICUT, ASSIGNOR TO HARTFORD-EMPIRE COMPANY, OF HARTFORD, CONNECTICUT, A CORPORATION OF DELAWARE

CONVEYING MECHANISM FOR GLASSWARE AND THE LIKE

Original application filed January 9, 1928, Serial No. 245,315. Divided and this application filed July 6, 1931. Serial No. 548,921.

My invention relates to means for receiving and conveying glassware and similar articles, particularly glass bottles and the like, as they are delivered by the take-out mechanism of fabricating machines.

More particularly it is intended for use in connection with a fabricating machine or machines the product of which is delivered at a plurality of points and at substantially uniform time intervals to the same conveyor.

The present application is a division of my copending application Ser. No. 245,315, filed January 9, 1928, now Patent No. 7,840,301, granted January 12, 1932.

When a plurality of take-out mechanisms are associated with a single conveyor, the bottles delivered to the conveyor at the one point tend to interfere with the delivery at other points. While it is practical to avoid this difficulty for particular speeds of delivery for the take-out mechanisms, the problem is complicated although the ware is delivered by the several mechanisms while acting in timed relationship one with another, and particularly so when it involves some minor variations in the rate of delivery by the plurality of take-out mechanisms.

The present invention overcomes such difficulties by providing a high-speed conveyor upon which the take-out mechanisms deposit the product, the speed of travel of such conveyor being such that the individual bottles are carried away before they can be interfered with by bottles subsequently deposited on said conveyor.

The high-speed conveyor delivers the bottles to a second and slow-speed conveyor which travels at such a relatively low speed that the bottles will be spaced thereon at substantially uniform spacing.

Owing to the high speed of the first or receiving conveyor, the bottles deposited thereon are usually upset into a recumbent position, so that they require setting up on the second or low-speed conveyor.

I therefore provide means for receiving the bottles from the high-speed conveyor and setting them up on the low-speed conveyor, said means being specifically shown as a curved tubular chute or deflector.

Again my present invention provides means whereby the bottles received by the low-speed conveyor at a relatively low level may be elevated to a higher level for delivery, such as to the tongs of a lehr-stacker. It will be obvious that this elevator in and of itself may be used for purposes and associated with a conveyor other than the low-speed, high-speed combination shown herein.

Other novel features of arrangement, and also of construction, will appear from the following description.

In the accompanying drawing wherein I have illustrated a practical embodiment of the principles of my present invention, Fig. 1 is a plan view of the entire device; Fig. 2 is an elevation with parts in section showing the delivery end of the low-speed conveyor and the elevator; Fig. 3 is a perspective view of the elevator and the delivery end of the low-speed conveyor with the elevator raised and with the ware stop therefor omitted; Fig. 4 is a fragmentary enlarged longitudinal sectional view of the elevator and the adjacent end of the low-speed conveyor, with the elevator lowered; Fig. 5 is a fragmentary side elevational view of the elevator and associated structure, with the ware stop omitted; and Fig. 6 is an enlarged transverse section, substantially on line 6—6 of Fig. 5, through the elevator and loading platform structures.

Referring to the drawing, the numerals 1, 2, 3 and 4 represent a plurality of take-out mechanisms associated with fabricating mechanism, not shown, and delivering the bottles or other ware at different points along the path of the receiving conveyor 5.

The conveyor 5 is of the endless type and may be, and preferably is, formed of woven asbestos material, such for instance as automobile brake lining. The conveyor 5 runs over two spaced apart and horizontally aligned drums 6, one of which is driven by means of its shaft 7. The drums 6 are journalled on stands 8 which are in turn mounted on a table (not shown), and are adjustable relative to said table in any preferred manner, so that the level of the conveyor may be varied to suit the work of the particular shaping machine and take-outs.

The numeral 10 represents suitable lateral guides supported from the stands 8 and adjustable toward and away from each other. These guides overlap the conveyor and hold the bottles in proper alignment thereon.

The speed of travel of the conveyor 5 is such that each bottle delivered thereto by the several take-out mechanisms is carried away so quickly that there is no chance of a bottle subsequently delivered by a take-out further along the line of conveyor travel interfering with it. For example, the conveyor 5 may be caused to travel at a rate of 400 feet per minute.

The bottles are delivered from high speed conveyor 5 to a low speed conveyor 11 which is preferably at a lower level. Owing to the relatively high speed of the conveyor 5, the bottles will be almost immediately upset when deposited thereon by the take-out mechanisms, and therefore means are povided for setting the bottles up as they are delivered to the low-speed conveyor.

A downwardly curved deflecting member or chute 12 is mounted on stand 8 adjacent to the drum 6 toward which the ware-bearing strand of the conveyor moves, to guide the recumbent bottles as the conveyor passes about the drum and to direct them in upright position onto the conveyor 11. One lower side portion of the chute is cut away to permit the passage of the bottles on conveyor 11 while the outer or end portion of the chute and the adjacent drum extend into close proximity with lateral guides 13 which are preferably provided for the conveyor 11 to assure proper delivery of the bottles to the slow-speed conveyor.

The difference in speed between the conveyors 5 and 11 is such that while the bottles may not be delivered at uniform intervals through the chute 12, they are spaced on the conveyor 11 with substantial uniformity.

Frequently owing to the exigency of plant arrangement or of the lehr or lehr-stacker, it is necessary to elevate the bottles to a higher level than that of the conveyor 11. For this purpose I provide elevating means to which the conveyor 11 delivers the bottles.

Thus, I have shown the elevator 14 which is arranged to be raised and lowered by any convenient means, such as the fluid-pressure cylinder 15, which may be actuated by any suitable means in synchronism with a stacker or other ware-handling device with which the apparatus is associated.

The elevator 14 comprises a ware-supporting top floor or platform 50, a bottom 51, and front and rear members 52 and 53, respectively, which connect the top 50 and the bottom 51 with each other. The bottom 51 of the elevator is mounted on the stem of a piston 54 that is reciprocable vertically in the cylinder 15, so that the elevator will be raised and lowered when the piston 54 is reciprocated.

The elevator is guided during its vertical movements and is retained against horizontal displacement by a ware-receiving and elevator-loading platform structure. The latter may comprise a frame including a pair of side members 55 projecting beyond the sides of the conveyor 11 at the discharge end of the latter and a plurality of horizontally spaced transverse rollers having end portions or shafts journalled in the frame members 55. The roller nearest to the discharge end of the conveyor 11 is indicated at 56, while the remaining rollers are designated 57. The bottom 51 of the elevator may be located below the loading platform. The rear member 53 of the elevator may extend between the roller 56 and the adjacent roller 57. The front 52 of the elevator may have extending side edge portions arranged to slide in vertical guideways 58 at the ends of the side members 55 of the loading platform. The top floor of the elevator may have substantially the form of a grid and comprise spaced bars or slats 59 which extend at right angles with the rollers 56 and 57 and therefore in the same direction as the ware bearing strand of the conveyor 11.

The bars 59 have spaced substantially semi-circular cut-away portions 60 at their lower edges adapted to mesh with peripheral grooves 61 in the rollers 57 so that the upper edges of the bars 59 and therefore the plane of the ware-supporting platform of the elevator will be located below or not higher than the level of the highest portions of the rollers of the receiving and loading platform when the elevator is in its lowered position as shown in Figs. 4, 5 and 6 and in full lines in Fig. 2.

The rollers of the loading platform may be turned in unison by a train of gearing 62, including driven gears on extended ends of the rollers, a drive gear 63 which may be driven by a rotating member of the driving mechanism of the conveyor 11, and suitable intermediate gears so that all the rollers of the loading platform will be turned in the direction required to move the ware received from the conveyor 11 when the elevator is lowered toward an upwardly projecting vertically adjustable stop 17 at the front of the elevator platform. The stop 17 serves to properly position the ware on the platform. The raising of the elevator transfers the support of the ware to the platform of the elevator and the ware then may be elevated to proper position for its delivery. Thus, I show the elevator in its raised position in Fig. 3 and in dotted lines in Fig. 2, and in the latter view, I show at 18 the tongs of a lehr-stacker grasping a bottle on the elevator.

The members 53 of the elevator will serve as a guard to retard the delivery of the ware until the elevator is lowered, should ware arrive at the discharge end of the conveyor 11 while the elevator is raised. In actual practice, the operations of the elevator and the conveyors will be so synchronized that such untimely arrival of the ware at the discharge end of the conveyor 11 is unlikely to occur.

Thus, assuming that bottles are to be delivered to the high speed conveyor 5 at a plurality of different points along the length of such conveyor in relatively timed relationship, such as one each second from a take-out mechanism, e. g. one of the take-out mechanisms as shown operating once every four seconds, the speed of travel of the conveyor is sufficiently high in respect to the intervals between successive deliveries of bottles to the conveyor to effect movement of a bottle deposited thereon at any one of such delivery points beyond the remaining delivery point or points further along the conveyor before the delivery of a bottle or bottles at such remaining delivery point or points. The high speed of the conveyor 5 causes the bottles to be upset and to be carried on their side on such conveyor but also assures movement of the upset bottles to the setting-up station and subsequent setting up of such bottles before any harmful sagging or deformation thereof has taken place.

It is evident from the foregoing that by the use of my invention, the bottles will be carried away and delivered by the conveyor 5 without interference, and will be spaced on the conveyor 11 with substantially uniform spacing. The combination therewith of the elevator enables the bottles so delivered to be properly presented to the lehr-stacker.

I claim as my invention:

1. In glass machinery, a conveyor for transporting articles of glassware, a ware-receiving platform at the delivery end of said conveyor, an elevator for transporting ware from said receiving platform to a different level, and vertically adjustable means carried by the elevator for engaging with the ware delivered thereto to position the ware on the elevator and to maintain such ware in upright position.

2. In glass machinery, a conveyor, a receiving platform at the delivery end of the conveyor, said receiving platform comprising a plurality of horizontally spaced transverse rollers, means for turning said rollers in unison to move ware delivered thereto away from the conveyor, certain of said rollers having peripheral grooves, an elevator platform movable vertically above said rollers and comprising bars adapted to enter the grooves of said rollers so that the plane of the ware supporting surface of said elevator platform will not be higher than the highest portions of said rollers when the elevator is lowered, whereby the elevator will lift the ware from the rollers when the elevator is raised, and means for raising and lowering said elevator.

3. In glass machinery, a conveyor, a receiving platform at the delivery end of the conveyor, said receiving platform comprising a plurality of horizontally spaced transverse rollers, an elevator comprising a platform adapted to automatically lift ware from said rollers when the elevator is raised from its lowered position, means for guiding said elevator in its vertical movements, and a member depending from said elevator platform between adjacent rollers of the receiving platform and proximate to the conveyor for checking the travel of ware at the delivery end of the conveyor, should ware arrive at the receiving platform while the elevator is raised.

Signed at Hartford, Connecticut this 1st day of July 1931.

RAYMOND G. BACHELLER.